（12) United States Patent
Uriu et al.

(10) Patent No.: US 10,988,973 B2
(45) Date of Patent: Apr. 27, 2021

(54) GLASS PANEL UNIT, GLASS WINDOW PROVIDED WITH SAME, AND METHOD FOR MANUFACTURING GLASS PANEL UNIT

(71) Applicant: Panasonic Intellectual Property Management Co., Ltd., Osaka (JP)

(72) Inventors: Eiichi Uriu, Osaka (JP); Hiroyuki Abe, Osaka (JP); Tasuku Ishibashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/763,960

(22) PCT Filed: Sep. 14, 2016

(86) PCT No.: PCT/JP2016/004179
§ 371 (c)(1),
(2) Date: Mar. 28, 2018

(87) PCT Pub. No.: WO2017/056418
PCT Pub. Date: Apr. 6, 2017

(65) Prior Publication Data
US 2019/0055776 A1      Feb. 21, 2019

(30) Foreign Application Priority Data

Sep. 29, 2015 (JP) .............................. JP2015-192247

(51) Int. Cl.
*E06B 3/67*         (2006.01)
*C03C 27/06*     (2006.01)
(Continued)

(52) U.S. Cl.
CPC .............. *E06B 3/6715* (2013.01); *B32B 3/18* (2013.01); *B32B 7/14* (2013.01); *B32B 17/064* (2013.01);
(Continued)

(58) Field of Classification Search
CPC .. E06B 3/6715; E06B 3/6612; E06B 3/66304; E06B 3/66333; E06B 3/66357;
(Continued)

(56) References Cited

U.S. PATENT DOCUMENTS 3,935,683 A * 2/1976 Derner .............. B32B 17/10055
52/172
5,005,557 A    4/1991 Bachli
(Continued)

FOREIGN PATENT DOCUMENTS

CN      104302593 A    1/2015
JP      S49-097810 A   9/1974
(Continued)

OTHER PUBLICATIONS

International Search Report issued in Application No. PCT/JP2016/004182 dated Dec. 20, 2016, with English translation.
(Continued)

*Primary Examiner* — Donald J Loney
(74) *Attorney, Agent, or Firm* — McDermott Will & Emery LLP

(57) ABSTRACT

A glass panel unit includes: a first panel; a second panel facing the first panel; a sealing member bonded to respective facing peripheral portions of the first panel and the second panel; and at least one spacer provided in a reduced pressure space between the first panel and the second panel. The at least one spacer includes a resin body and at least one ultraviolet protective layer provided on a surface of the resin body.

2 Claims, 8 Drawing Sheets

(51) Int. Cl.
| | |
|---|---|
| *E06B 3/663* | (2006.01) |
| *E06B 3/677* | (2006.01) |
| *B32B 3/18* | (2006.01) |
| *B32B 7/14* | (2006.01) |
| *B32B 17/06* | (2006.01) |
| *B32B 27/28* | (2006.01) |
| *B32B 37/00* | (2006.01) |
| *B32B 37/24* | (2006.01) |
| *B32B 38/18* | (2006.01) |
| *E06B 3/66* | (2006.01) |
| *E06B 3/673* | (2006.01) |

(52) U.S. Cl.
CPC ........ *B32B 27/281* (2013.01); *B32B 37/0076* (2013.01); *B32B 37/24* (2013.01); *B32B 38/1858* (2013.01); *C03C 27/06* (2013.01); *E06B 3/663* (2013.01); *E06B 3/6612* (2013.01); *E06B 3/66304* (2013.01); *E06B 3/66333* (2013.01); *E06B 3/66357* (2013.01); *E06B 3/677* (2013.01); *E06B 3/6775* (2013.01); *E06B 3/67334* (2013.01); *B32B 2315/08* (2013.01); *B32B 2379/08* (2013.01); *B32B 2419/00* (2013.01); *E06B 3/673* (2013.01); *E06B 3/67304* (2013.01); *E06B 3/67321* (2013.01); *E06B 3/67326* (2013.01); *E06B 2003/66338* (2013.01)

(58) Field of Classification Search
CPC ........... E06B 2003/66338; E06B 3/673; E06B 3/67304; E06B 3/67321; E06B 3/67326; E06B 3/677; E06B 3/6775; Y02B 80/24
See application file for complete search history.

(56) References Cited

U.S. PATENT DOCUMENTS

| | | | |
|---|---|---|---|
| 5,009,218 A | | 4/1991 | Bachli |
| 5,124,185 A | * | 6/1992 | Kerr ..................... E06B 3/6612 428/34 |
| 5,156,894 A | | 10/1992 | Hood et al. |
| 5,891,536 A | | 4/1999 | Collins et al. |
| 6,054,195 A | | 4/2000 | Collins et al. |
| 6,071,575 A | | 6/2000 | Collins et al. |
| 6,083,578 A | | 7/2000 | Collins et al. |
| 6,541,084 B2 | | 4/2003 | Wang et al. |
| 6,830,791 B1 | | 12/2004 | Misonou et al. |
| 6,946,171 B1 | | 9/2005 | Aggas |
| 2002/0106463 A1 | | 8/2002 | Wang et al. |
| 2007/0063633 A1 | | 3/2007 | Yokota et al. |
| 2012/0088045 A1 | | 4/2012 | Veerasamy |
| 2015/0068666 A1 | | 3/2015 | Abe et al. |
| 2016/0231626 A1 | | 8/2016 | Kodera et al. |

FOREIGN PATENT DOCUMENTS

| | | |
|---|---|---|
| JP | S63-501728 A | 7/1988 |
| JP | H05-502487 A | 4/1993 |
| JP | H05-209482 A | 8/1993 |
| JP | H6-306966 A | 11/1994 |
| JP | H08-165148 A | 6/1996 |
| JP | H09-095533 A | 4/1997 |
| JP | H10-507500 A | 7/1998 |
| JP | H11-209149 A | 8/1999 |
| JP | 2000-087656 A | 3/2000 |
| JP | 2001-030391 A | 2/2001 |
| JP | 2001-316138 A | 11/2001 |
| JP | 2002-080247 A | 3/2002 |
| JP | 2002-226237 A | 8/2002 |
| JP | 2002-262328 A | 8/2002 |
| JP | 2007-238351 A | 9/2007 |
| JP | 2009-286876 A | 12/2009 |
| JP | 2009-286877 A | 12/2009 |
| JP | 2010-007034 A | 1/2010 |
| JP | 2012-508335 A | 4/2012 |
| JP | 2013-127639 A | 6/2013 |
| JP | 2013-163304 A | 8/2013 |
| JP | 2013-532240 A | 8/2013 |
| JP | 2014-024894 A | 2/2014 |
| TW | 400411 B | 8/2000 |
| TW | I267100 B | 11/2006 |
| TW | 201336679 A | 9/2013 |
| TW | 201535027 A | 9/2015 |
| WO | 91/02133 A1 | 2/1991 |
| WO | 96/12862 A1 | 5/1996 |
| WO | 98/56727 A1 | 12/1998 |
| WO | 01/021924 A1 | 3/2001 |
| WO | 2010/053943 A1 | 5/2010 |
| WO | 2011/144588 A1 | 11/2011 |
| WO | 2013/008724 A1 | 1/2013 |
| WO | 2013/172033 A1 | 11/2013 |

OTHER PUBLICATIONS

Extended European Search Report issued in Application No. 16850599.8 dated Sep. 12, 2018.
Wang Duo, "Development of the compound material in polyimide modification by TiO2," Collection of Assays in China Engineering Plastics Composite Technology Seminar of 2008, 2008, pp. 68-70, with English translation.
Office Action issued in corresponding Chinese Patent Application No. 201680056812.5, dated Mar. 25, 2020, with English translation.
International Search Report issued in Application No. PCT/JP2016/004179 dated Dec. 20, 2016, with English translation.

* cited by examiner

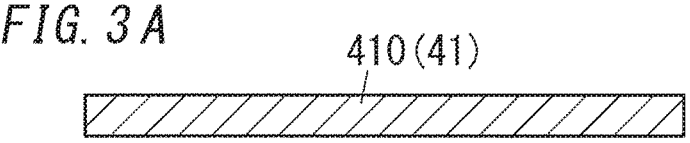
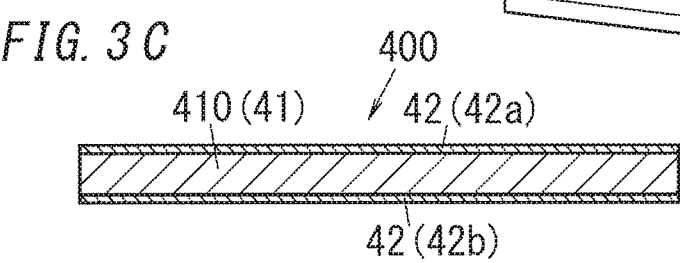
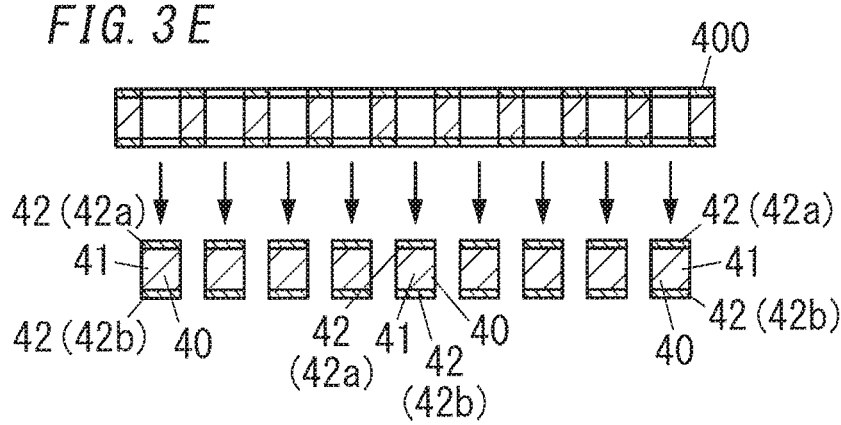

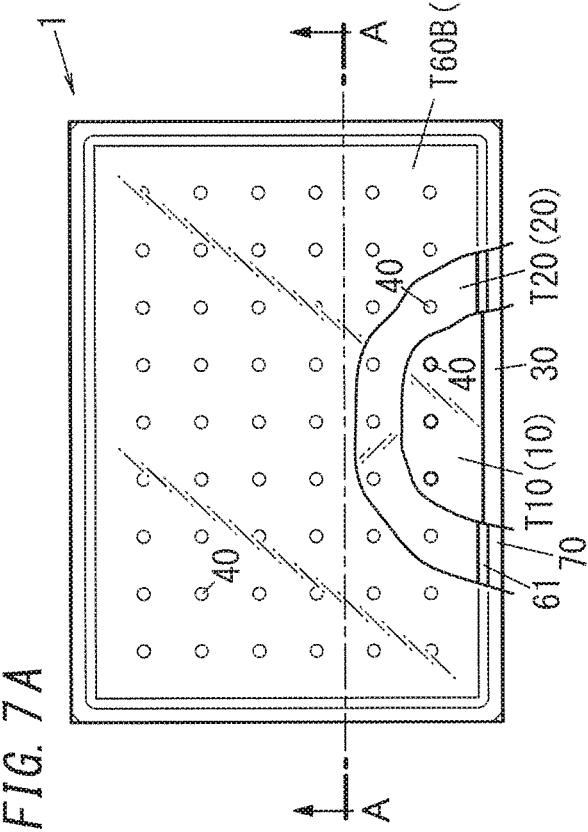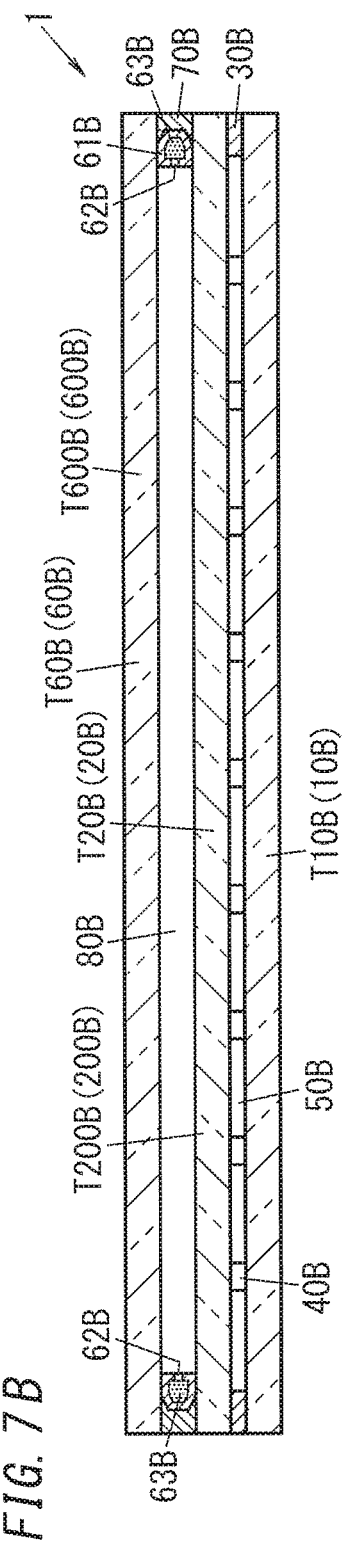
FIG. 7A
FIG. 7B

GLASS PANEL UNIT, GLASS WINDOW PROVIDED WITH SAME, AND METHOD FOR MANUFACTURING GLASS PANEL UNIT

RELATED APPLICATIONS

This application is the U.S. National Phase under 35 U.S.C. § 371 of International Application No. PCT/JP2016/004179, filed on Sep. 14, 2016, which in turn claims the benefit of Japanese Application No. 2015-192247, filed on Sep. 29, 2015, the disclosures of which are incorporated in their entirety by reference herein.

TECHNICAL FIELD

The present invention relates to a glass panel unit, a glass window including a glass panel unit, and a method for manufacturing a glass panel unit.

BACKGROUND ART

A glass panel having a vacuum space between a pair of glass plates (hereinafter referred to as a "vacuum glass panel") has been known in the art. The vacuum glass panel is also called a "multiple pane." The vacuum glass panel has excellent thermal insulation properties because the vacuum space reduces heat conduction. When a vacuum glass panel is manufactured, two glass plates to form a pair are bonded together with a gap left between them, the space inside the pair is evacuated, and the inner space is sealed hermetically, thus forming a vacuum space there.

It has been proposed that spacers be used to maintain a sufficient thickness for the vacuum space of such a vacuum glass panel. The spacers are parts to be interposed between the two glass plates. The spacers are required to have some strength, and therefore, a metal is one of well-known materials for the spacers. Meanwhile, spacers made of a polymer have also been disclosed as in Patent Literature 1, for example.

According to Patent Literature 1, using a polymer (i.e., a resin) as a material for the spacers imparts some flexibility to the spacers. However, it is not easy to ensure a sufficient thickness for the vacuum space successfully with such polymer spacers. In addition, installing a vacuum glass panel in a place exposed to an ultraviolet ray (e.g., outdoors) would make the spacers easily degradable, which is not beneficial.

CITATION LIST

Patent Literature

Patent Literature 1: U.S. Pat. No. 6,541,084 B2

SUMMARY OF INVENTION

It is therefore an object of the present invention to provide a vacuum glass panel allowing for reducing the degradation of the spacers to keep a vacuum space stably and also provide a method for manufacturing such a vacuum glass panel.

A glass panel unit according to the present disclosure includes: a first panel including at least a first glass plate; a second panel facing the first panel and including at least a second glass plate; a frame member bonding respective peripheral portions of the first panel and the second panel together; and a spacer provided between the first panel and the second panel. A reduced pressure space is provided as an inner space between the first panel and second panel. The spacer includes a resin body and at least one ultraviolet protective layer provided on a surface of the resin body.

A glass window according to the present disclosure includes: the glass panel unit described above; and a window frame attached to a peripheral portion of the glass panel unit.

A method for manufacturing a vacuum glass panel includes: a composite sheet forming step of forming an ultraviolet protective layer on at least one surface of a resin sheet; a spacer forming step of forming a plurality of spacers by punching a composite sheet including the resin sheet and the ultraviolet protective layer; a spacer arrangement step of arranging the plurality of spacers between a first substrate including a first glass substrate and a second substrate including a second glass substrate; a glass adhesive disposing step of disposing a glass adhesive in a frame shape between the first substrate and the second substrate; an evacuation step of evacuating a space located between the first substrate and the second substrate and surrounded with the glass adhesive; and a bonding step of bonding the first substrate and the second substrate together with the glass adhesive.

BRIEF DESCRIPTION OF DRAWINGS

FIGS. 1A and 1B illustrate an exemplary glass panel unit, wherein FIG. 1A is a cross-sectional view of the exemplary glass panel unit and FIG. 1B is a plan view of the exemplary glass panel unit;

FIGS. 3A to 3F illustrate some steps of an exemplary manufacturing process of the glass panel unit in which spacers are being formed, wherein FIGS. 3A, 3C, and 3E are cross-sectional views and FIGS. 3B, 3D, and 3F are perspective views;

FIGS. 6A and 6B illustrate another exemplary glass panel unit (as a second embodiment), wherein FIG. 6A is a cross-sectional view of the exemplary glass panel unit and FIG. 6B is a plan view of the exemplary glass panel unit;

FIGS. 7A and 7B illustrate a glass panel unit according to a third embodiment, wherein FIG. 7A is a cutaway plan view of the glass panel unit according to the third embodiment, and FIG. 7B is a cross-sectional view thereof taken along the plane A-A shown in FIG. 7A.

DESCRIPTION OF EMBODIMENTS

The following embodiments relate to a glass panel unit, a glass window including the glass panel unit, and a method for manufacturing a glass panel unit, and more particularly relate to a glass panel unit having a reduced pressure space as an inner space between a pair of panels of glass, a window frame including the glass panel unit, and a method for manufacturing such a glass panel unit.

Figure 1A:
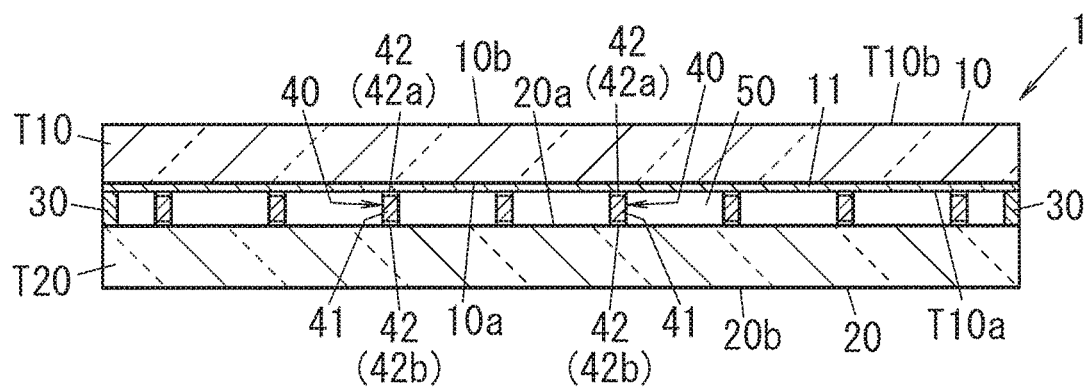
Figure 1B:
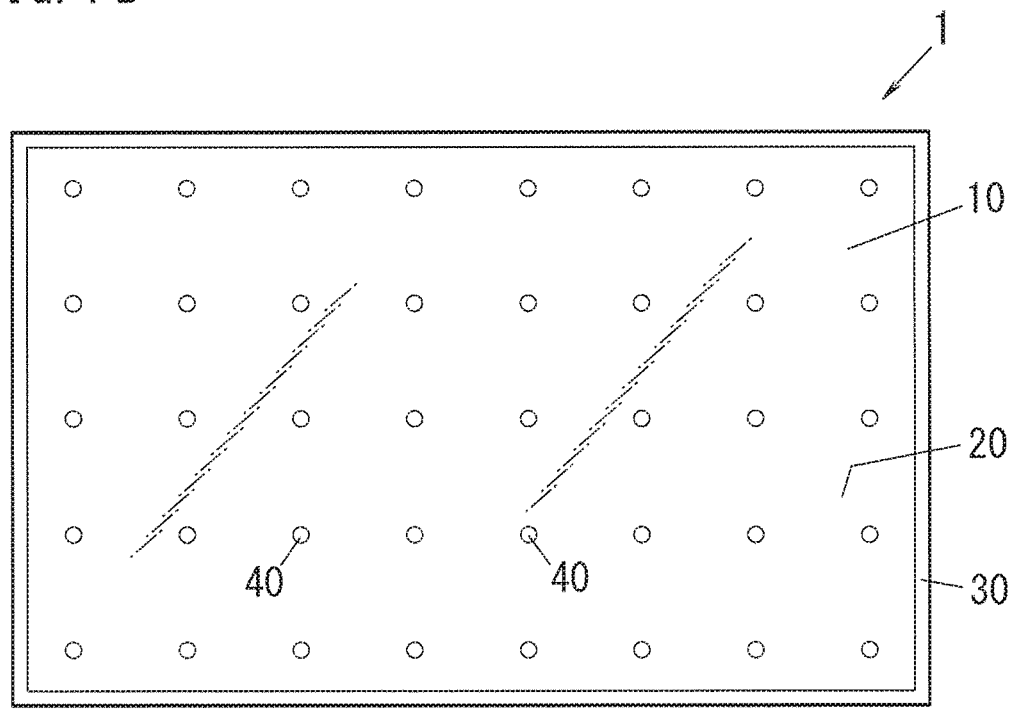

FIGS. 1A and 1B illustrate an exemplary glass panel unit (hereinafter referred to as a "glass panel unit 1"). In the following description, FIGS. 1A and 1B will be collectively referred to as "FIG. 1." FIG. 1A is a cross-sectional view and FIG. 1B is a plan view. Note that FIGS. 1A and 1B illustrate the glass panel unit 1 just schematically and the dimensions of respective portions thereof are not necessarily to scale and may be different from actual ones. Particularly, in FIG. 1A, the thickness of the glass panel unit is illustrated to be larger than the actual one to facilitate the reader's understanding. In addition, the spacers are also illustrated in a larger size (i.e., a relative size thereof with respect to the entire glass panel unit) than actual ones.

The glass panel unit 1 is basically transparent, and therefore, internal parts of the glass panel unit 1 (such as a frame member 30 and spacers 40) are visible. FIG. 1B illustrates such visible internal parts. More specifically, FIG. 1B is a plan view of the glass panel unit 1 seen from a first glass plate 10 thereof.

The glass panel unit 1 includes a first panel T10, a second panel T20 facing the first panel T10, a sealing member (e.g., a frame member 30 in this embodiment) bonding the respective peripheral portions of the first panel T10 and the second panel T20 together, and spacers 40 arranged between the first panel T10 and the second panel T20. The glass panel unit 1 has an inner space (hereinafter referred to as a "first inner space") implemented as a reduced pressure space (e.g., a vacuum space 50 in this embodiment). The vacuum space 50 is provided between the first panel T10 and the second panel T20. The spacers 40 each include a resin body 41 and at least one ultraviolet protective layer 42 provided on a surface of the resin body 41.

The first panel T10 includes at least a glass plate (hereinafter referred to as a "first glass plate 10"). That is to say, the first panel T10 includes at least the first glass plate 10. In this embodiment, the first panel T10 includes the first glass plate 10 and a thermal reflective film 11 provided on an inner surface (first surface 10a) of the first glass plate 10. Alternatively, the first panel T10 may consist of the first glass plate 10 alone.

The second panel T20 includes at least a glass plate (hereinafter referred to as a "second glass plate 20"), That is to say, the second panel T20 includes at least the second glass plate 20. In this embodiment, the second panel T20 consists of the second glass plate 20 alone. Alternatively, the second panel T20 may include not only the second glass plate 20 but also a coating, for example, which may be provided on an inner or outer surface of the second glass plate 20.

In the glass panel unit 1 of this embodiment, the spacers 40 with a resin body 41 may have a lower thermal conductivity than metallic spacers, thus increasing the thermal insulation properties of the vacuum glass panel. In addition, the resin has more elasticity than a metal, and therefore, is able to absorb the force applied to the glass plates, thus enhancing the impact resistance of the vacuum glass panel. Moreover, the ultraviolet protective layer 42 provided on the surface of the resin body 41 protects the resin body 41 from an incoming ultraviolet ray and decreases the area of the resin body 41 being exposed to the ultraviolet ray, thus reducing degradation of the spacers due to the exposure to the ultraviolet ray. This is because the ultraviolet protective 42 layer has the ability not to allow an ultraviolet ray to pass therethrough. Degradation of the resin spacers due to the ultraviolet exposure would decompose the resin into its chemical ingredients, thus generating a gas and possibly negatively affecting the vacuum space (e.g., causing a decrease in the degree of vacuum (i.e., an increase in the pressure in the vacuum space)). Among other things, if the resin includes a carbonyl group or a benzene ring, a portion of the resin with such ingredients will be decomposed particularly easily when exposed to ultraviolet radiation. In addition, degradation of the resin spacers due to the ultraviolet exposure could cause a decrease in the strength of the spacers, which could make the vacuum glass panel breakable more easily. Furthermore, degradation of the resin spacers due to the ultraviolet exposure would make the spacers discolored, thus possibly having a negative impact on the appearance of the vacuum glass panel. Thus, according to this embodiment, the use of the spacers 40 described above allows for reducing the degradation of the spacers 40 due to the ultraviolet exposure and thereby keeping a vacuum space stably.

In the first panel T10, the inner surface thereof is defined to be a first surface T10a, and the outer surface thereof is defined to be a second surface T10b. Likewise, in the second panel T20, the inner surface thereof is defined to be a first surface 20a, and the outer surface thereof is defined to be a second surface 20b. The first surface T10a of the first panel T10 and the first surface 20a of the second panel T20 face each other. In the first glass plate 10, the inner surface thereof is defined to be a first surface 10a, and the outer surface thereof is defined to be a second surface 10b. In this embodiment, the second surface 10b of the first glass plate 10 is identical to the second surface T10b of the first panel T10.

The first glass plate 10 and the second glass plate 20 may have a thickness of 1 to 10 mm, for example. In this embodiment, the first glass plate 10 may be as thick as the second glass plate 20, which would facilitate the manufacturing process because the same glass plate may be used when the first glass plate 10 is as thick as the second glass plate 20.

As shown in FIG. 1B, the first glass plate 10 and the second glass plate 20 have a rectangular shape, and the glass panel unit 1 is also rectangular overall. When viewed in plan, the first glass plate 10 and the second glass plate 20 have their outer edges aligned with each other. As used herein, viewing the glass panel unit 1 in plan means viewing the glass panel unit 1 in the thickness direction thereof.

Examples of materials for the first glass plate 10 and the second glass plate 20 include soda lime glass, high strain point glass, chemically strengthened glass, no-alkali glass, quartz glass, Neoceram, and physically strengthened glass.

The vacuum space 50 is sealed hermetically by the first panel T10, the second panel T20, and the frame member 30. The frame member 30 serves as a sealer. The vacuum space 50 may have a degree of vacuum of equal to or less than a predetermined value. The predetermined degree of vacuum may be 0.01 Pa, for example. The vacuum space 50 may be created by evacuation. The vacuum space 50 may have a thickness of 10 to 1000 μm, for example. Thus, it can be said that the glass panel unit 1 of this embodiment is a vacuum glass panel.

Note that as a glass panel unit, the inner space surrounded with the first panel 10, the second panel T20, and the frame member 30 does not have to be a vacuum space but may also be a reduced pressure space with a lower pressure than the atmospheric pressure. The reason is that reducing the pressure in the inner space lowers the thermal conductivity of the glass panel unit 1, thus improving the thermal insulation properties thereof.

Optionally, the glass panel unit 1 may have a gas adsorbent material in the vacuum space 50. The gas adsorbent material may include a getter. The gas adsorbent material adsorbs the gas in the vacuum space 50, thus maintaining a sufficient degree of vacuum in the vacuum space 50 and improving the thermal insulation properties. The gas adsorbent material may be provided for any of the inner surface (i.e., the first surface T10a) of the first panel T10, the inner surface (i.e., the first surface 20a) of the second panel T20, a side of the frame member 30, or the inside of the spacers 40.

The frame member 30 may be made of a glass adhesive. Examples of the glass adhesive include hot melt glass, which is also called "low-melting glass." The glass adhesive may be a glass frit including hot melt glass. Examples of the glass frits include a bismuth-based glass frit (i.e., a glass fit including bismuth), a lead-based glass frit (i.e., a glass frit including lead), and a vanadium-based glass frit (i.e., a glass frit including vanadium). These are examples of low-melting glass. Using the low-melting glass allows for reducing the thermal damage to be done on the spacers 40 during the manufacturing process of the glass panel unit 1.

The frame member 30 is placed on the outer edge (peripheral portion) of the glass panel unit 1. That is to say, the frame member 30 bonds the first panel T10 and the second panel T20 together. The frame member 30 creates a space between the first panel T10 and the second panel T20. Having the frame member 30 bond the first panel T10 and the second panel T20 together protects the outer edge of the glass panel unit 1.

The first panel T10 includes a thermal reflective film 11. In this case, the thermal reflective film 11 is provided on the inner surface (i.e., the first surface 10a) of the first glass plate 10. Providing the thermal reflective film 11 on the first glass plate 10 reduces the heat conduction in the thickness direction of the glass panel unit 1, thus further improving the thermal insulation properties.

The thermal reflective film 11 may be implemented as an infrared reflective film, for example. The infrared reflective film is able to cut off incoming infrared rays, thus improving the thermal insulation properties of the glass panel unit 1. The thermal reflective film 11 may be a low-E film, which may be a stack of two types of metallic thin films that are alternately stacked one upon the other a number of times. Specific examples of such a low-E film include a multi-layer film in which Ag and ZnO thin films are alternately stacked one upon the other. Optionally, the thermal reflective film 11 may have heat shield properties. The thermal reflective film 11 may be implemented as one, two, or more metallic thin films with the ability to cut off incoming infrared rays. The metallic thin film is thin enough to transmit incoming light and hardly affects the transparency of the glass panel unit 1.

The thermal reflective film 11 separates the vacuum space 50 from the first glass plate 10 so that the vacuum space 50 and the first glass plate 10 are not directly in contact with each other. The thermal reflective film 11 is provided over the entire first surface 10a of the first glass plate 10. Optionally, the second panel T20 may include a thermal reflective film similar to the thermal reflective film 11 on the first surface 20a of the second glass plate 20. Alternatively, the first panel T10 may have no thermal reflective films 11.

When the glass panel unit 1 is applied to a building, for example, the first glass plate 10 may face the exterior and the second glass plate 20 may face the interior. Naturally, these glass plates may be arranged reversely, i.e., so that the first glass plate 10 faces the interior and the second glass plate 20 faces the exterior. As can be seen, the glass panel unit 1 may be installed such that the first glass plate 10 faces the outside of an object (such as a building) to which the glass panel unit 1 is attached and the second glass plate 20 faces the inside of that object. The glass panel unit 1 may be used in, for example, windows, partitions, signage panels, and showcases (including refrigerating showcases and food warming showcases).

The glass panel unit 1 includes a plurality of spacers 40. Those spacers 40 maintain a gap between the first panel T10 and the second panel T20, thus creating the vacuum space 50 easily.

The spacers 40 are arranged in the vacuum space 50. The spacers 40 are in contact with the thermal reflective Film 11 provided on the first glass plate 10. The spacers 40 are also in contact with the second glass plate 20. In this embodiment, the spacers 40 are columnar. The spacers 40 may have a diameter of 0.1 to 10 mm, for example. The smaller the diameter of the spacers 40 is, the less perceivable the spacers 40 will be. On the other hand, the larger the diameter of the spacers 40 is, the stronger the spacers 40 will be. The spacers 40 may have a height of 10 to 1000 μm, for example. The height of the spacers 40 defines the gap between the first panel T10 and the second panel T20, i.e., the thickness of the vacuum space 50.

Those spacers 40 are arranged at respective intersections of a virtual grid of a figure with four sides and four right angles (see FIG. 1B). The spacers 40 may be arranged at a pitch of 10 to 100 mm, for example. Specifically, this pitch may be 20 mm. The shapes, sizes, number, pitch, and arrangement pattern of the spacers 40 are not particularly limited but may be selected appropriately. For example, the spacers 40 may have prismatic shapes or spherical shapes.

The spacers 40 of this glass panel unit 1 are made of a resin. More specifically, the spacers 40 each include a body 41 made of a resin (hereinafter referred to as a "resin body 41") and at least one ultraviolet protective layer 42. The ultraviolet protective layer 42 is provided on one or both surfaces of the resin body 41. The resin body 41 is made of a resin, and therefore, easily degradable when exposed to an ultraviolet ray. That is why the ultraviolet protective layer 42 is provided for the resin body 41.

In the known art, a metal has generally been used as a material for spacers of a vacuum glass panel. However, a metal has too high thermal conductivity to achieve thermal insulation advantageously. In addition, a metal has too poor elasticity to absorb impact effectively, thus making the vacuum glass panel more vulnerable to impact. Glass or a ceramic could be used as a material for the spacers. In that case, however, the strength would tend to decrease. A resin with high strength could be used according to another method. However, a resin is easily degradable when exposed to an ultraviolet ray, thus making it difficult to select an appropriate resin. When a resin is used, ultraviolet protection ability is imparted to a glass plate as a means for reducing the degradation of the resin according to an approach. Nevertheless, such a glass plate with ultraviolet protection ability is too expensive to make a vacuum glass plate easily at a low cost. On top of that, to protect the spacer portions from the ultraviolet exposure, the ultraviolet protection ability needs to be imparted to the entire glass plate, which is far from an efficient measure to take. In the glass panel unit 1 of this embodiment, the spacers 40 are each made up of the resin body 41 and the ultraviolet protective layer 42, thus efficiently reducing the degradation of the resin due to the ultraviolet exposure. Those spacers 40 are able to reduce the degradation of the resin significantly, creating the vacuum space 50 with good stability without negatively affecting the appearance easily. Furthermore, the spacers 40 with a resin have elasticity high enough to increase the impact resistance. Moreover, the spacers 40 with a resin have such a low thermal conductivity as to improve the thermal insulation properties of the glass panel unit 1.

The structure of spacers for a vacuum glass panel will be described in further detail with reference to FIGS. 2A to 2C, which are cross-sectional views illustrating a spacer and its surrounding portion in a vacuum glass panel. The example illustrated in FIG. 2A corresponds to the glass panel unit 1 of the embodiment shown in FIG. 1. The examples illustrated in FIGS. 2B and 2C represent modified examples of the embodiment shown in FIG. 1. The spacers 40 shown in FIGS. 2B and 2C may be each replaced with the spacer 40 shown in FIGS. 1 and 2A.

Figure 2A:
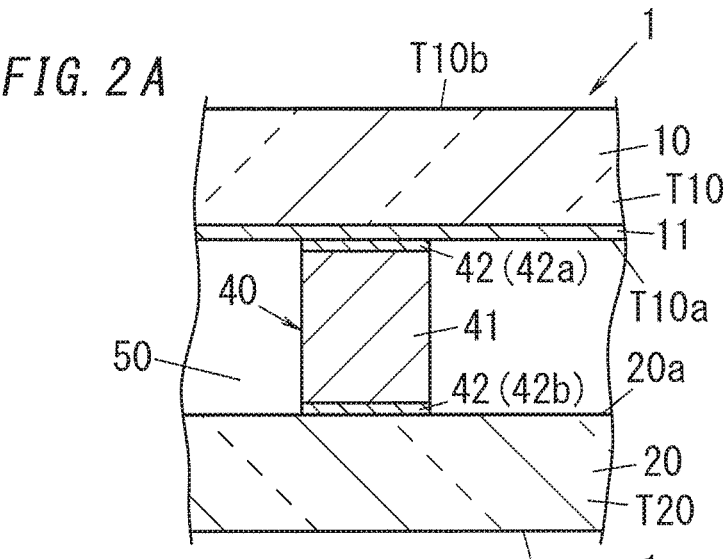
FIGS. 2A to 2C are enlarged cross-sectional views illustrating some examples (including variations) of the glass panel unit.
Figure 2B:
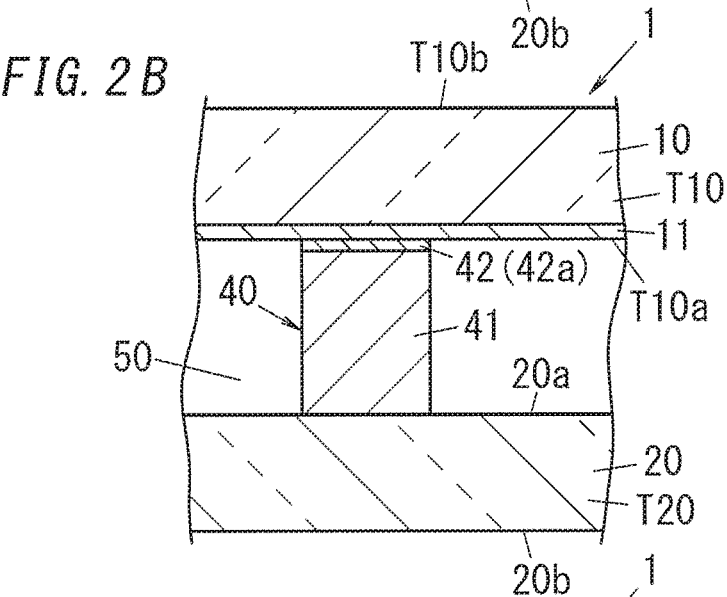
Figure 2C:
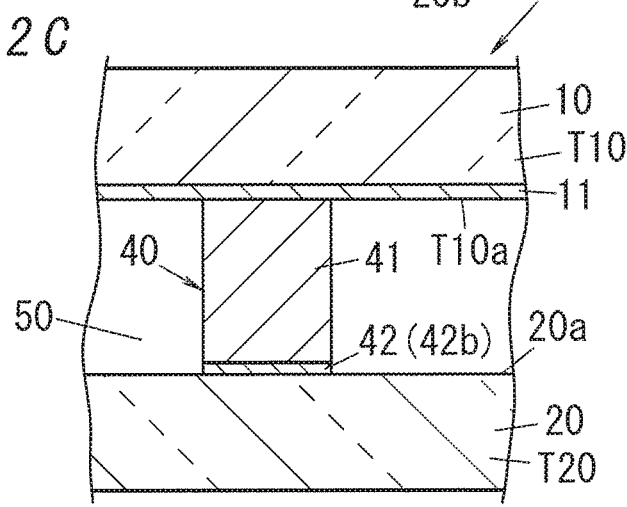

In FIG. 2A, the spacer 40 includes a resin body 41 and two ultraviolet protective layers 42, which are provided on both surfaces of the resin body 41 (i.e., on both surfaces in a center axis direction thereof). One of the two ultraviolet protective layers 42 is a first ultraviolet protective layer 42a and the other is a second ultraviolet protective layer 42b. In FIG. 2A, the ultraviolet protective layers 42 include the first ultraviolet protective layer 42a adjacent to the first panel T10 and the second ultraviolet protective layer 42b adjacent to the second panel T20. The first ultraviolet protective layer 42a is provided on a surface of the resin body 41 closer to the first panel T10. In other words, the first ultraviolet protective layer 42a is present between the first panel T10 and the resin body 41. More specifically, the first ultraviolet protective layer 42a is interposed between a thermal reflective film 11 and the resin body 41. The first ultraviolet protective layer 42a is in contact with the thermal reflective film 11. On the other hand, the second ultraviolet protective layer 42b is provided on a surface of the resin body 41 closer to the second panel T20. In other words, the second ultraviolet protective layer 42b is present between the second glass plate 20 and the resin body 41. The second ultraviolet protective layer 42b is in contact with the second panel T20 (i.e., the second glass plate 20).

Providing the ultraviolet protective layers 42 on both surfaces of the resin body 41 as shown in FIG. 2A substantially prevents an ultraviolet ray from impinging on the resin body 41 even in an environment where ultraviolet rays may enter the glass panel unit 1 through any of both surfaces thereof, thus significantly reducing the degradation of the spacers 40. In addition, protecting the resin body 41 with the ultraviolet protective layers 42 provided on both surfaces thereof substantially prevents an ultraviolet ray that has been incident on any of both surfaces of the glass panel unit 1 from entering the resin body 41. That is why no matter which of the two glass plates is placed in an environment with a lot of ultraviolet radiation (e.g., outside of a building), the ultraviolet radiation may still be substantially prevented from entering the resin body 41. This will make the characteristics of the glass panel unit 1 on both sides thereof even more equal to each other (i.e., further reduce the difference in characteristics between both sides thereof), thus making it easier to install the glass panel unit 1. On top of that, during the manufacturing process of the glass panel unit 1, the spacers 40 may be arranged with either of the two surfaces thereof facing up. This facilitates the arrangement of the spacers 40 and eventually facilitates the manufacturing process of glass panel unit 1 in the end. The thickness of the first ultraviolet protective layer 42a may be different from, but may also be equal to, that of the second ultraviolet protective layer 42b.

In the example illustrated in FIG. 2B, the spacer 40 includes the resin body 41 and a single ultraviolet protective layer 42, which is provided on one surface (i.e., one of the two surfaces in the center axis direction) of the resin body 41. The ultraviolet protective layer 42 corresponds to the first ultraviolet protective layer 42a shown in FIG. 2A and is adjacent to the first panel T10. The ultraviolet protective layer 42 is provided on a surface of the resin body 41 closer to the first panel T10. In other words, the ultraviolet protective layer 42 is present between the first panel T10 and the resin body 41. More specifically, the ultraviolet protective layer 42 is interposed between a thermal reflective film 11 and the resin body 41. The ultraviolet protective layer 42 is in contact with the thermal reflective film 11. Providing the ultraviolet protective layer 42 on only one side of the resin body 41 in this manner allows such an even simpler configuration to substantially prevent an incoming ultraviolet ray from impinging on the resin body 41. This may facilitate the manufacturing process of the glass panel unit 1.

in the example illustrated in FIG. 2C, the spacer 40 includes the resin body 41 and a single ultraviolet protective layer 42, which is provided on one surface (i.e., one of the two surfaces in the center axis direction) of the resin body 41. The ultraviolet protective layer 42 corresponds to the second ultraviolet protective layer 42b shown in FIG. 2A and is adjacent to the second panel T20. The ultraviolet protective layer 42 is provided on a surface of the resin body 41 closer to the second panel T20. In other words, the ultraviolet protective layer 42 is present between the second glass plate 20 and the resin body 41. More specifically, the ultraviolet protective layer 42 is in contact with the second panel T20 (i.e., the second glass plate 20). Providing the ultraviolet protective layer 42 on only one side of the resin body 41 in this manner allows such an even simpler configuration to substantially prevent an incoming ultraviolet ray from impinging on the resin body 41. This may facilitate the manufacturing process of the glass panel unit 1.

According to the configurations shown in FIGS. 2B and 2C, the ultraviolet protective layer 42 needs to be provided on only one side of the resin body 41, which is certainly advantageous. Nevertheless, according to these configurations, the glass panel unit 1 needs to be manufactured such that all spacers 40 are arranged in the same manner so that the respective ultraviolet protective layers 42 thereof are on either an upper side or a lower side. In addition, the glass panel unit 1 needs to be arranged such that the one side of every spacer 40 covered with the ultraviolet protective layer 42 is oriented to make the incoming ultraviolet ray incident thereon easily. For these reasons, the glass panel units 1 shown in FIGS. 2B and 2C is subjected to stricter regulation in terms of orientation than the glass panel unit shown in FIG. 2A. That is why it is more beneficial to adopt the configuration shown in FIG. 2A rather than the configurations shown in FIGS. 2B and 2C. Thus, it is recommended that the spacer 40 include the first ultraviolet protective layer 42a facing the first panel T10 and the second ultraviolet protective layer 42b facing the second panel T20. The thickness of the ultraviolet protective layer 42 varies depending on its material and is not particularly limited, but may be in the range of 0.01 to 10 μm, for example.

In an exemplary embodiment, the ultraviolet protective layer 42 is suitably a metallic thin film. According to the configuration shown in FIG. 2A, one of the first ultraviolet protective layer 42a or the second ultraviolet protective layer 42b is suitably a metallic thin film, and more suitably, both of them are metallic thin films. In the configuration shown in FIG. 2B, the ultraviolet protective layer 42 (corresponding to the first ultraviolet protective layer 42a) is suitably a metallic thin film. In the configuration shown in FIG. 2C, the ultraviolet protective layer 42 (corresponding to the second ultraviolet protective layer 42b) is suitably a metallic thin film. Making the metallic thin film reflect the incoming ultraviolet ray protects the resin body 41 from the ultraviolet exposure.

When implemented as a metallic film, the ultraviolet protective layer 42 may serve as an ultraviolet reflective film. A thin film made of a metal has excellent ultraviolet reflectivity. The ultraviolet protective layer 42 is suitably made of a material having the ability to reflect the incoming ultraviolet ray and to withstand the thermal process during the manufacturing process of the glass panel unit 1. Examples of the ultraviolet protective layers 42 include a noble metal layer of gold, platinum, silver or any other noble metal, an aluminum thin film, a thin film of copper, tin, or any other suitable metal, and a thin film of an alloy including at least one of these metals. Nevertheless, the type of the metal used may depend on the process environment. The thickness of the metallic thin film is not particularly limited but suitably falls within the range of 0.05 to 1 µm, for example. Setting the thickness of the metallic thin film within this range not only enhances the ultraviolet protection effect but also prevents the film from becoming too thick and too hard to avoid doing damage to the glass plates. The thickness of the metallic thin film may be greater than the thickness of the thermal reflective film 11. Also, the metallic thin film may have lower optical transmittance than the thermal reflective film 11.

In an exemplary embodiment, the ultraviolet protective layer 42 is suitably a resin layer. This resin layer has ultraviolet protection ability (i.e., the ability to protect something from ultraviolet exposure). When implemented as a resin layer, the ultraviolet protective layer 42 may serve as a degradation sacrificial layer. According to the configuration shown in FIG. 2A, at least one of the first ultraviolet protective layer 42a or the second ultraviolet protective layer 42b is suitably a resin layer, more suitably, both of these layers are resin layers. In the configuration shown in FIG. 2B, the ultraviolet protective layer 42 (corresponding to the first ultraviolet protective layer 42a) is suitably a resin layer. In the configuration shown in FIG. 2C, the ultraviolet protective layer 42 (corresponding to the second ultraviolet protective layer 42b) is suitably a resin layer.

When implemented as a resin layer, the ultraviolet protective layer 42 is provided as a separate layer on a surface of the resin body 41. In serving as a degradation sacrificial layer, this resin layer absorbs the ultraviolet ray and degrades itself to reduce the percentage of the ultraviolet ray reaching the resin body 41. That is to say, that resin layer sacrifices and degrades itself by being exposed to the incoming ultraviolet ray, thus protecting the resin body 41 from the incoming ultraviolet ray. According to an analysis, the incoming ultraviolet ray often reaches a depth of at most about 5 µm under the surface of the spacer 40, although the penetration depth varies depending on the type of the constituent resin material of the spacer 40. That is why if a resin body 41 with a thickness of 125 µm is used, providing a resin layer with a thickness of 5 µm (as a degradation sacrificial layer) on both surfaces of the resin body 41 significantly reduces the ultraviolet ray impinging on the resin body 41. The material for the resin layer suitably has substantially the same composition as the material for the resin body 41. Alternatively, the resin layer may be made of a material prepared by adding an ultraviolet protection agent to the material of the resin body 41, for example. The ultraviolet protection agent is able to substantially prevent the ultraviolet ray from entering the resin body 41. The ultraviolet protection agent may be inorganic particles, for example. Specific examples of the ultraviolet protection agents include mica and titanium dioxide. A resin layer containing an ultraviolet protection agent is suitably used as the ultraviolet protective layer 42. The thickness of the resin layer is not particularly limited but suitably falls within the range of 0.5 to 5 µm, and more suitably falls within the range of 1 to 3 µm.

The resin body 41 may be made of a heat-resistant resin, for example. During the manufacturing process of the glass panel unit 1, the frame member 30 may be bonded to the respective peripheral portions of the first panel T10 and the second panel T20 under heat. In this step, imparting heat resistance to the resin makes the resin body 1 hardly collapsible.

The resin body 41 is suitably made of a polyimide. In other words, the resin body 41 suitably includes a polyimide. Generally speaking, the polyimide has excellent heat resistance. Having high heat resistance, the polyimide is able to maintain its shape even under intense heat during the manufacturing process of the glass panel unit 1. In addition, the polyimide has high strength. Being a strong polymer, the polyimide is able to receive the force applied in such directions in which the two glass plates are brought closer to each other to ensure a predetermined gap between those glass plates. The use of a polyimide makes the spacers 40 highly heat-resistant and mechanically strong. Such spacers 40 of a polyimide allow for creating a vacuum space with good stability. The polyimide may be a product of a polycondensation reaction between a tetracarboxylic anhydride and a diamine. Examples of the polyimides include an aromatic polyimide. The polyimide suitably has high optical transmittance (i.e., suitably has transparency).

In this embodiment, the resin body 41 of the spacers 40 is suitably formed of at least one resin sheet. The use of a resin sheet makes it easier to form the spacers 40. Portions of the resin sheet may be cut out into pieces in the shape of spacers 40, which may be used as the spacers 40. An ultraviolet protective film may be provided on one or both surfaces of the resin sheet. More specifically, the spacers 40 may be formed of a resin sheet with an ultraviolet protective film (i.e., a stack of the resin sheet and the ultraviolet protective film, which may be hereinafter referred to as a "composite sheet"). The resin sheet will constitute the resin body 41 of the spacers 40. The ultraviolet protective film will constitute the ultraviolet protective layer 42 of the spacers 40. The resin sheet may be a resin film. The resin sheet may be a polyimide film, for example.

The individual resin bodies 41 of the spacers 40 may be formed of a single resin sheet. Alternatively, the resin bodies 41 of the spacers 40 may also be formed of two or more resin sheets. In the latter case, a stack of the resin sheets will constitute the spacers 40. In such a situation, providing an ultraviolet protective film on the outermost surface of the stack of sheets allows for forming spacers 40 with the ultraviolet protective layers 42. The spacers 40 may be obtained by cutting out portions of a film to a predetermined size by punching. Note that the resin bodies 41 of the spacers 40 do not have to be formed of such a resin sheet. Alternatively, the spacers 40 may also be formed as a stack of material substances. Specifically, the spacers 40 may be formed by depositing a metallic thin film by evaporation and applying a resin in the shape of the spacers 40 onto a glass plate.

An exemplary method for manufacturing the glass panel unit 1 (hereinafter referred to as an "exemplary manufacturing process") will be described.

Figure 4A:
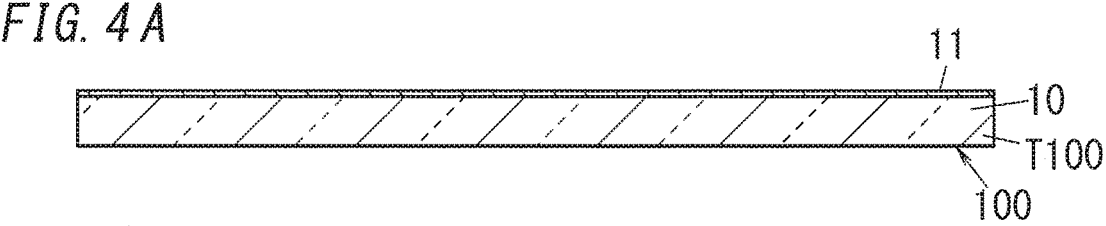
FIGS. 4A to 4D are cross-sectional views illustrating some steps of the exemplary manufacturing process of the glass panel unit in which the glass panel unit is being formed.
Figure 4B:
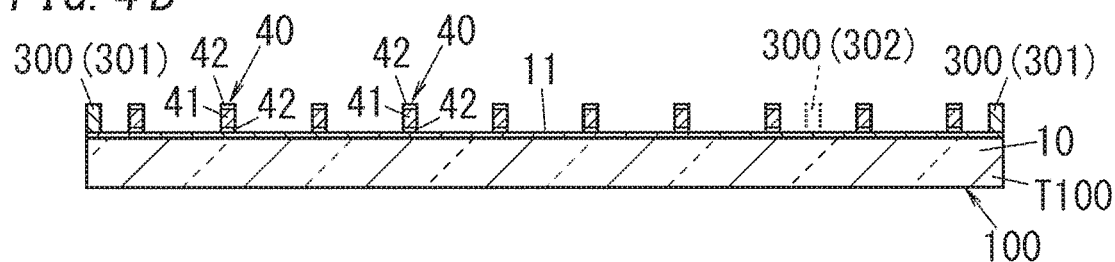

FIGS. 3A to 3F, FIGS. 4A to 4D, and FIGS. 5A to 5C illustrate an exemplary manufacturing process of the glass panel unit 1. Specifically, FIGS. 3A to 3F illustrate intermediate products obtained while spacers are being formed. FIGS. 3A, 3C, and 3E are cross-sectional views, and FIGS. 3B, 3D, and 3F are perspective views. In the following description, FIGS. 3A to 3F will be collectively referred to herein as FIG. 3. FIGS. 4A to 4D are cross-sectional views and will be collectively referred to herein as FIG. 4. FIGS. 5A to 5C are plan views. FIG. 5C illustrates internal members just like FIG. 1B. FIGS. 5A to 5C will be collectively referred to herein as FIG. 5. The glass panel unit 1 shown in FIG. 1 may be manufactured by the exemplary method illustrated in FIGS. 3, 4, and 5. Note that FIG. 4 illustrates the members and materials of the glass panel unit of FIG. 1 upside down. That is to say, FIG. 4 is drawn such that the first panel T10 is located under the second panel T20.

The method for manufacturing the glass panel unit 1 includes a composite sheet forming step, a spacer forming step, a spacer arrangement step, a glass adhesive disposition step, an evacuation step, and a bonding step. The composite sheet forming step is a step of forming an ultraviolet protective layer 42 on at least one surface of the resin sheet 410. The spacer forming step is a step of forming spacers 40 by punching the composite sheet 400 including the resin sheet 410 and the ultraviolet protective layer 42. The spacer arrangement step is a step of arranging the spacers 40 between a first glass substrate 100 and a second glass substrate 200. The glass adhesive disposition step is a step of disposing a glass adhesive 300 in a frame shape between the first glass substrate 100 and the second glass substrate 200. The evacuation step is a step of evacuating the space surrounded with the glass adhesive 300 between the first glass substrate 100 and the second glass substrate 200. The bonding step is a step of bonding the first glass substrate 100 and the second glass substrate 200 together with the glass adhesive 300.

In the manufacturing process of the glass panel unit 1, first of all, a composite sheet 400 to be spacers 40 is formed as shown in FIG. 3. Use of the composite sheet 40 allows for efficiently manufacturing the glass panel unit 1 capable of reducing the degradation of the spacers 40. It will be described in detail how to form the spacers 40 out of the composite sheet 400.

To form the spacers 40, first of all, a resin sheet 410 to be resin bodies 41 is provided. The resin sheet 410 is illustrated in FIGS. 3A and 3B. Each resin body 41 may be formed of either a single resin sheet or a stack of a plurality of resin sheets. In other words, the resin sheet 410 may include either one resin sheet or two or more resin sheets. A plurality of sheets may be bonded together by pressure (i.e., by pressure bonding), by utilizing the self-adhesiveness of the resin, with an adhesive, or with electrostatic force, for example.

Next, as shown in FIGS. 3C and 3D, an ultraviolet protective layer 42 (ultraviolet protective film) is formed either on one surface or on both surfaces of the resin sheet 410. In FIGS. 3C and 3D, the ultraviolet protective layers 42 are formed on both surfaces of the resin sheet 410. One of the two ultraviolet protective layers 42 serves as a first ultraviolet protective layer 42a and the other serves as a second ultraviolet protective layer 42b. In FIG. 3D, the range covered with the ultraviolet protective layer 42 is indicated by a dotted pattern to facilitate the understanding. As can be seen, the ultraviolet protective layer 42 may be formed to cover the entire surface of the resin sheet 410. The thickness of the first ultraviolet protective layer 42a may be different from, but may also be equal to, the thickness of the second ultraviolet protective layer 42b.

The ultraviolet protective layer 42 may be formed by an appropriate method. If the ultraviolet protective layer 42 is implemented as a metallic thin film, then the metallic thin film (which will serve as the ultraviolet protective layer 42) may be formed by depositing a metal on the surface of the resin sheet 410 by evaporation, sputtering, or any other suitable process. For example, an aluminum thin film may be deposited easily by this method. Alternatively, the metallic thin film (which will serve as the ultraviolet protective layer 42) may also be formed by printing a metallic resinate paste on the surface of the resin sheet 410 and baking the paste. A gold or platinum thin film, for example, may be deposited easily by this method. The baking temperature may be in the range of about 350 to 450° C., for example. If a thermal load is applied to the resin sheet 410 while the ultraviolet protective layer 42 is being formed, the resin sheet 410 suitably has heat resistance. Among other things, it is advantageous to form a polyimide film as the metallic thin film, because the polyimide has high heat resistance.

If the ultraviolet protective layer 42 is implemented as a resin layer (which will serve as a degradation sacrificial layer), the resin layer (which will serve as the ultraviolet protective layer 42) may be formed by applying a resin material onto the surface of the resin sheet 410, for example. The material of the resin layer may be the same as the material of the resin body 41 or may be obtained by adding an ultraviolet protection agent to the material of the resin body 41. Naturally, the resin layer (which will serve as the ultraviolet protective layer 42) may also be made of a different resin from the resin body 41.

Forming the ultraviolet protective layers 42 completes the composite sheet 400. The composite sheet 400 includes the resin sheet 410 and the ultraviolet protective layer(s) 42. As shown in FIG. 3C, the composite sheet 400 includes the ultraviolet protective layers 42 on both surfaces of the resin sheet 410. Alternatively, the composite sheet 400 may also be composed of the resin sheet 410 (which will serve as the resin body 41) and the ultraviolet protective layer 42 provided on one surface of the resin sheet 410. In that case, spacers 40 having the ultraviolet protective layer 42 on one surface will be obtained as shown in FIGS. 2B and 2C.

After the composite sheet 400 has been formed, spacers 40 are formed by punching the composite sheet 400 as shown in FIGS. 3E and 3F. Only two of the plurality of spacers 40 cut out by punching are illustrated as samples in FIG. 3F. The spacers 40 may be formed by cutting out portions having the shape of the spacers 40 from the composite sheet 400 with a puncher. A plurality of spacers 40 are usually formed out of a single composite sheet 400. For example, cutting out circular portions from the composite sheet 400 forms a plurality of columnar spacers 40. The spacers 40 may each have a diameter of 0.5 mm, for example. The plurality of spacers 40 thus obtained may be used in the manufacturing of the glass panel unit 1.

The manufacturing method of the glass panel unit 1 will be further described with reference to FIGS. 4 and 5.

According to the manufacturing method of the glass panel unit 1, a glass composite 2 including a first substrate T100 with the first glass substrate 100, a second substrate T200 with the second glass substrate 200, the glass adhesive 300, and the spacers 40 is formed as an intermediate product. The glass composite 2 is illustrated in FIG. 4C.

At the beginning of the manufacturing process of the glass panel unit 1, first of all, the first substrate T100 and the second substrate T200 are provided. The manufacturing process of the glass panel unit 1 includes a glass substrate providing step. The first substrate T100 provided is illustrated in FIGS. 4A and 5A. The first substrate T100 includes at least the first glass substrate 100. In this embodiment, the first substrate T100 includes the first glass substrate 100 and a thermal reflective film 11 provided on the surface of the first glass substrate 100. The first glass substrate 100 will eventually turn into a first glass plate 10 as a result of this manufacturing method. Optionally, the glass substrate providing step may include adjusting the size of the first glass substrate 100 to an appropriate one and loading the first glass substrate 100 into a predetermined apparatus.

Although only the first substrate T100 is illustrated in FIGS. 4A and 5A, the second substrate T200 is also provided separately. Providing the second substrate T200 includes providing a glass substrate of a predetermined size so that the second substrate T200 may be paired with the first substrate T100. The second substrate 7200 includes at least the second glass substrate 200. In this embodiment, the second glass substrate 200 consists of a second glass plate 20 alone but may further include a thermal reflective film.

Figure 4C:
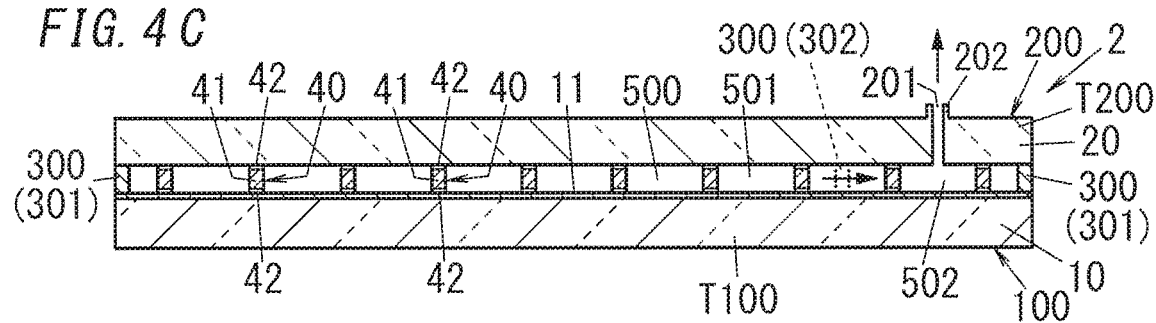
Figure 5A:
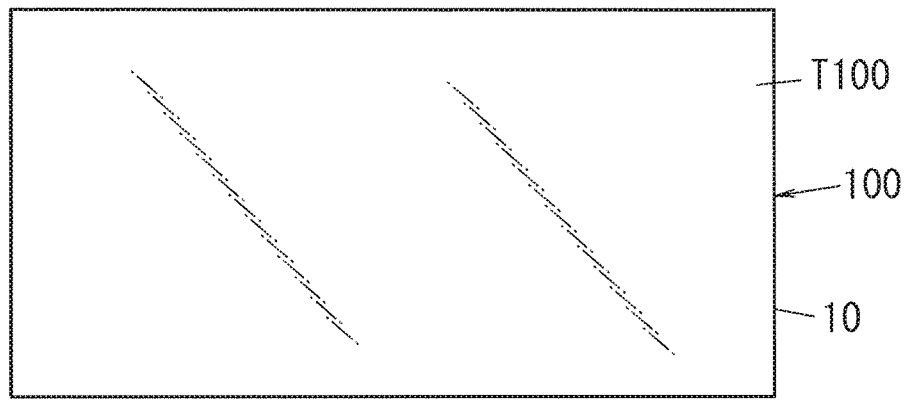
FIGS. 5A to 5C are plan views illustrating some steps of the exemplary manufacturing process of the glass panel unit in which the glass panel unit is being formed.
Figure 5B:
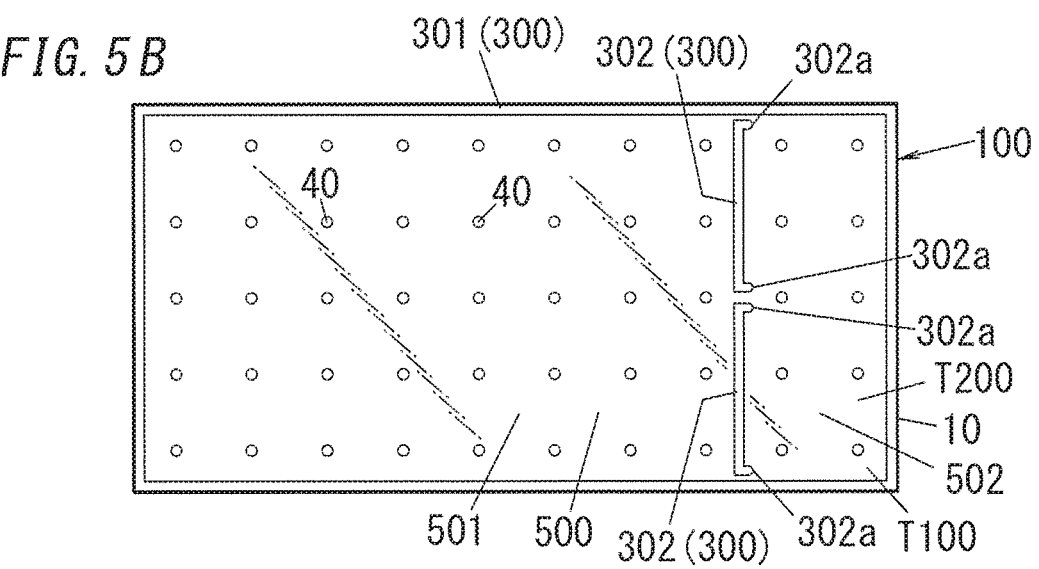
Figure 5C:
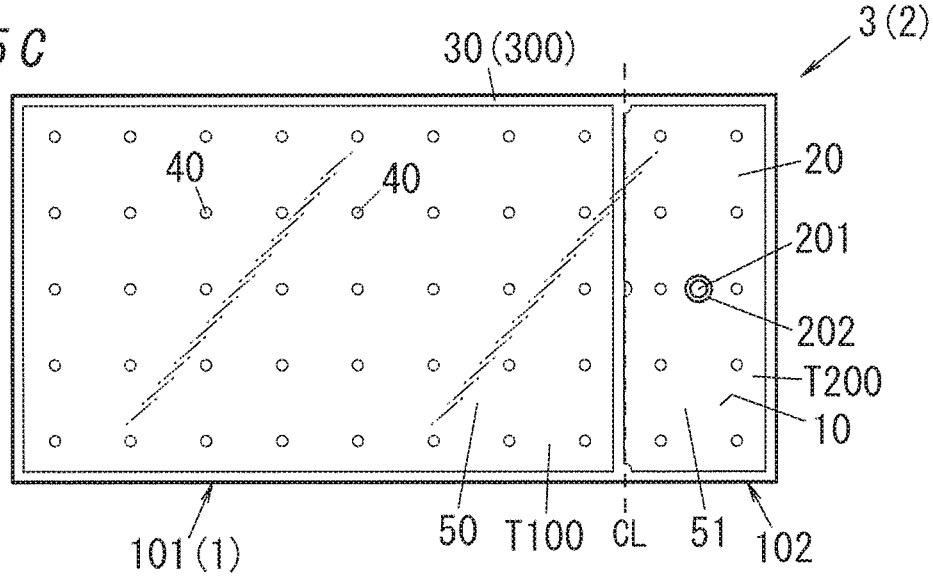

In FIG. 4C, shown is the second substrate T200 (which has already been stacked over the first substrate T100). The second substrate T200 has an exhaust port 201, which is a communication channel composed of a hole running through the second glass substrate 200 and an exhaust pipe 202. The exhaust pipe 202 protrudes from the outer periphery of the hole that runs through the second glass substrate 200. The inner face of the exhaust pipe 202 is continuous with the hole that runs through the second glass substrate 200. Providing the second substrate T200 may include cutting the exhaust port 201 through the second glass substrate 200 and connecting the exhaust pipe 202 to the second glass substrate 200.

Speaking of the panel size, the size of the first substrate T100 and the second substrate T200 provided at the beginning of the manufacturing process is set to be larger than the size of the first panel T10 and the second panel T20 of the glass panel unit 1 as a final product. In this exemplary manufacturing process, the first substrate T100 and the second substrate T200 are partially removed ultimately. Each of the first substrate T100 and the second substrate T200 for use in the manufacturing process includes a portion to be the glass panel unit 1 and a portion to be removed ultimately.

Next, as shown in FIGS. 4B and 5B, the glass adhesive 300 is disposed (in the glass adhesive disposition step). The spacers 40 may be arranged along with the glass adhesive 300 being disposed. Examples of the glass adhesive 300 include hot melt glass. The glass adhesive 300 is disposed in the shape of a frame and will ultimately form the frame member 30.

The glass adhesive 300 includes at least two types of glass adhesives (hereinafter referred to as a "first glass adhesive 301" and a "second glass adhesive 302," respectively), The first glass adhesive 301 and the second glass adhesive 302 are disposed at respectively predetermined locations. In FIG. 4B, the second glass adhesive 302 is indicated by the dotted rectangle. This means that the second glass adhesive 302 is disposed only discontinuously in a straight line parallel to the shorter sides of the first glass substrate 100. The relative arrangement of the first glass adhesive 301 and the second glass adhesive 302 is understandable from FIG. 5B.

After the first glass adhesive 301 and the second glass adhesive 302 have been disposed, pre-baking may be performed. Pre-baking allows each of the first glass adhesive 301 and the second glass adhesive 302 to have their internal glass powder particles bonded together. Nevertheless, the first glass adhesive 301 and the second glass adhesive 302 are out of contact with each other. Pre-baking decreases the chances of unintentionally and carelessly scattering the glass adhesive 300. Optionally, during the pre-baking process, the first glass adhesive 301 and the second glass adhesive 302 may be fixed onto the first glass substrate 100. Pre-baking may be carried out by heating the glass adhesive 300 to a temperature lower than the melting temperature thereof.

The spacers 40 are suitably arranged after the glass adhesive 300 has been disposed. This facilitates the arrangement of the spacers 40. The spacers 40 may be arranged at regular intervals. Alternatively, the spacers 40 may also be dispersed irregularly. The spacers 40 may be formed of the composite sheet 400 as described above. The spacers 40 may be arranged with a chip mounter, for example. Although the spacers 40 are formed of the resin sheet 410 in the exemplary manufacturing process described above, the spacers 40 may also be formed by a known thin film deposition process instead. For example, the spacers 40 may be formed by depositing a metallic thin film (which will serve as one of the ultraviolet protective layers 42) on the surface of a glass plate by evaporation process, applying a resin (which will serve as the resin body 41) thereto, and then depositing another metallic thin film (which will serve as the other ultraviolet protective layer 42) thereon by evaporation process in this order.

In FIG. 4B, the glass adhesive 300 is disposed on the first substrate T100. However, the glass adhesive 300 may also be disposed in any appropriate way. For example, the glass adhesive 300 may be disposed on the second substrate T200. Alternatively, after the first substrate T100 and the second substrate T200 have been arranged to face each other, the glass adhesive 300 may be injected into the gap between the first substrate T100 and the second substrate T200. In that case, the glass adhesive 300 will be disposed on both of the first substrate T100 and the second substrate T200 simultaneously.

Optionally, a gas adsorbent may be disposed on one or both of the first substrate T100 and the second substrate T200. In that case, a solid gas adsorbent may be bonded or a gas adsorbent material with fluidity may be applied and dried.

As shown in FIG. 5B, the first glass adhesive 301 is disposed along the outer periphery (i.e., the peripheral portion) of the first substrate T100. The first glass adhesive 301 is formed, on the first substrate T100, in the shape of a continuous frame that makes one round of the first substrate T100. The second glass adhesive 302 is provided so as to be located at an end of the glass panel unit 1 as a final product. The second glass adhesive 302 is disposed to be surrounded with, and located inside, the first glass adhesive 301.

In FIG. 5B, two pieces of the second glass adhesive 302 are arranged in line parallel to the shorter sides of the glass panel unit 1. The number of pieces of the second glass adhesive 302 may also be one or three or more. Those pieces of the second glass adhesive 302 are arranged to form a wall. When the second substrate T200 (glass substrate 200) is laid upon the first substrate T100 as shown in FIG. 5B, an inner space 500 is formed between the first substrate T100 and the second substrate T200. The second glass adhesive 302 partitions the inner space 500 into two spaces. Note that the second glass adhesive 302 does not completely partition the inner space 500 into the two spaces but is disposed such that those two spaces in the inner space 500 communicate with each other. Of these two partitioned spaces of the inner space 500, the space located more distant from the exhaust port 201 is defined herein to be a first space 501, while the space located closer to the exhaust port 201 is defined herein to be a second space 502. The first space 501 and the second space 502 are partitioned by the second glass adhesive 302. At a position facing the second space 502, located is the exhaust port 201 cut through the second substrate T200 (see FIG. 4C). Meanwhile, there are no exhaust ports 201 at any position facing the first space 501. In this exemplary manufacturing process, the second glass adhesive 302 is out of contact with the first glass adhesive 301, and the two pieces of the second glass adhesive 302 are spaced from each other, thus allowing the first space 501 and the second space 502 to communicate with each other. The gaps between the first glass adhesive 301 and the second glass adhesive 302 and the gap between the two pieces of the second glass adhesive 302 serve as air passages during the evacuation. In the evacuation step, air is pumped out of the first space 501 through the air passages.

Next, as shown in FIG. 4C, the second substrate T200 is mounted on the glass adhesive 300 so as to face the first substrate T100 (i.e., the panel arrangement step is performed), thus forming a glass composite 2 including the first substrate T100, the second substrate T200, the glass adhesive 300, and the spacers 40. The glass composite 2 has the inner space 500 between the first substrate T100 and the second substrate T200. As already described with reference to FIG. 5B, the inner space 500 is partitioned into two spaces. In FIG. 4C, the second glass adhesive 302 is indicated by the dotted rectangle. Note that the second glass adhesive 302 does not completely partition the inner space 500 into two spaces.

Then, the glass composite 2 is heated. The glass composite 2 may be heated in a heating furnace. Heating causes a rise in the temperature of the glass composite 2. In this case, heating the glass adhesive 300 to a melting temperature melts the glass in the glass adhesive 300, thus allowing the glass adhesive 300 to express adhesiveness. The glass adhesive 300 may have a melting temperature higher than 300° C., for example. The melting temperature of the glass adhesive 300 may be higher than 400° C. Nevertheless, the lower the melting temperature of the glass adhesive 300 is, the more advantageous it is to perform the process smoothly. For this reason, the melting temperature of the glass adhesive 300 is suitably at most equal to or less than 400° C., more suitably 360° C. or less. The melting temperature of the first glass adhesive 301 is suitably different from that of the second glass adhesive 302.

The heating step is suitably performed in two or more stages. For example, the heating process may be carried out such that the temperature of the glass composite 2 is raised through a first stage of heating to a predetermined temperature, which will be maintained for a while and then will be further raised to another predetermined temperature through a second stage of heating. The first stage of heating is defined herein to be a "first heating step" and the second stage of heating is defined herein to be a "second heating step."

In this exemplary manufacturing process, the first glass adhesive 301 melts at a lower temperature than the second glass adhesive 302. In other words, the first glass adhesive 301 melts earlier than the second glass adhesive 302. In the first heating step, the first glass adhesive 301 does melt, but the second glass adhesive 302 does not. Melting of the first glass adhesive 301 allows the first glass adhesive 301 to bond the first substrate T100 and the second substrate T200 together, thus sealing the inner space 500 hermetically. The temperature at which the first glass adhesive 301 melts but the second glass adhesive 302 does not melt is defined herein to be a first melting temperature. Since the second glass adhesive 302 does not melt at the first inciting temperature, the second glass adhesive 302 maintains its shape.

After the temperature has reached the first melting temperature, the evacuation step is started to pump the gas out of the inner space 500 (i.e., the evacuation step is performed). In that case, the evacuation step may be performed after the temperature has become lower than the first melting temperature (such a temperature will be hereinafter referred to as an "evacuation starting temperature"). Alternatively, the evacuation step may be started even before the first melting temperature is reached, unless the glass composite 2 is deformed.

The evacuation step may be performed with a vacuum pump connected to the exhaust port 201. In this case, the exhaust pipe 202 may be connected to a pipe extending from the vacuum pump. The evacuation step reduces the pressure in the inner space 500 to create a vacuum in the inner space 500. Note that such an evacuation step is only an exemplary step for the manufacturing process of this embodiment. That is to say, the evacuation step may be performed by a different evacuation method. For example, the evacuation step may also be performed with the glass composite 2 disposed in its entirety in a low pressure chamber such that the entire glass composite 2 is evacuated.

In FIG. 4C, the direction in which the gas in the inner space 500 is released is indicated by the upward arrow. In addition, in FIG. 4C, the direction in which the gas flows from the first space 501 to the second space 502 is indicated by the rightward arrow. Since the second glass adhesive 302 is disposed to provide air passages as described above, the air passes through those air passages to be pumped out through the exhaust port 201. This creates a vacuum in the inner space 500 including the first space 501 and the second space 502.

After the degree of vacuum in the inner space 500 has reached a predetermined value, the glass composite 2 is heated to a higher temperature (i.e., the second heating step is performed). The heating temperature is raised with the evacuation continued. Raising the heating temperature allows the temperature to reach a second melting temperature, which is higher than the first melting temperature. The second melting temperature may be higher than the first melting temperature by 10 to 100° C., for example.

Optionally, the glass adhesive 300 may melt to the point that softening of the hot melt glass under the heat allows the glass adhesive 300 to be deformed or bonded. In that case, the glass adhesive 300 does not have to exhibit such a degree of meltability that causes the glass adhesive 300 to flow out.

At the second melting temperature, the second glass adhesive 302 melts. This allows the second glass adhesive 302 melted to bond the first glass substrate 100 and the second glass substrate 200 together at the location where the second glass adhesive 302 is disposed. In addition, the second glass adhesive 302 softens due to its meltability. Furthermore, the second glass adhesive 302 softened may be deformed to close the air passages. In this exemplary manufacturing process, the gaps (i.e., the air passages) left between the first glass adhesive 301 and the second glass adhesive 302 are closed. In addition, the gap (i.e., the air passage) left between the two pieces of the second glass adhesive 302 is also closed. Each piece of the second glass adhesive 302 has a pair of closing portions 302a at both ends thereof (see FIG. 5B). Such closing portions 302a each have a larger amount of the second glass adhesive 302 and are arranged to extend parallel to the longer sides of the glass panel unit 1 at the ends of each piece of the second glass adhesive 302. Deforming the closing portions 302a closes the air passages described above. Note that the bonding step may be performed in parallel with the first and second heating steps. In this exemplary manufacturing process, the evacuation step may proceed in the middle of the bonding step.

Figure 4D:
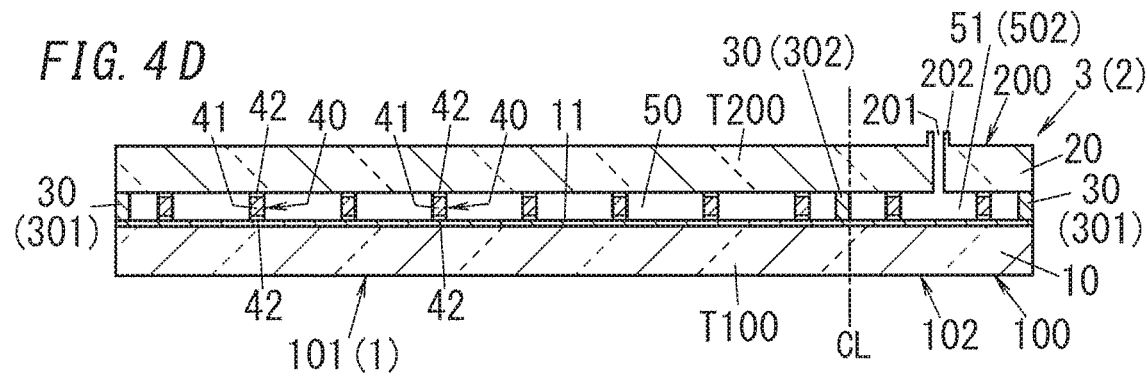

FIGS. 4D and 5C illustrate how the glass composite 2 looks after the air passages have been closed. In the glass composite 2, the first substrate T100 and the second substrate T200 are integrated together due to the adhesion action of the glass adhesive 300. The glass composite 2 thus integrated serves as a panel as an intermediate product (hereinafter defined as an "integrated panel 3").

The vacuum space 50 is formed by splitting the inner space 500 into a vacuum space 50 located more distant from the exhaust port 201 and an evacuation space 51 located closer to the exhaust port 201. Deformation of the second glass adhesive 302 creates the vacuum space 50, which is formed of the first space 501. The evacuation space 51 is formed of the second space 502. The vacuum space 50 and the evacuation space 51 do not communicate with each other. The vacuum space 50 is sealed hermetically by the first glass adhesive 301 and the second glass adhesive 302.

In the integrated panel 3, the first glass adhesive 301 and the second glass adhesive 302 are integrated together to form the frame member 30, which surrounds the vacuum space 50. The frame member 30 also surrounds the evacuation space 51. The first glass adhesive 301 forms part of the frame member 30, and the second glass adhesive 302 forms another part of the frame member 30.

After the vacuum space 50 has been created, the integrated panel 3 is cooled. Also, after the vacuum space 50 has been created, the evacuation step is stopped. Sealing the vacuum space 50 hermetically allows the vacuum space 50 to be maintained even though the evacuation step is no longer performed. In any case, the evacuation step is stopped for safety after the integrated panel 3 has been cooled. Optionally, the evacuation space 51 may recover the ordinary pressure since the evacuation step is no longer performed.

Finally, the integrated panel 3 is cut off. The integrated panel 3 includes a portion to be the glass panel unit 1 (hereinafter defined as a "glass panel unit portion 101") and an unnecessary portion (hereinafter defined as an "unnecessary portion 102"). The glass panel unit portion 101 includes the vacuum space 50. The unnecessary portion 102 has the exhaust port 201.

In FIGS. 4D and 5C, the cutting line of the integrated panel 3 is indicated by the broken line (i.e., the cutting line CL). The integrated panel 3 may be cut off along the outer edge of the frame member 30 of a portion to be the glass panel unit 1 eventually. The integrated panel 3 is cut off along an appropriate line so that the vacuum space 50 is not destroyed.

When the integrated panel 3 is cut off, the unnecessary portion 102 is removed and the glass panel unit portion 101 is taken out. The glass panel unit 1 as shown in FIG. 1 is obtained from this glass panel unit portion 101. Cutting off the first substrate T100 and the second substrate T200 forms a cut face at the end of the first panel T10 and the second panel T20 of the glass panel unit 1.

As can be seen, the manufacturing process of the glass panel unit 1 suitably further includes such a cutting step of cutting off the first substrate T100 and the second substrate T200 after the bonding step. By cutting off these substrates, a glass panel unit 1 with no exhaust ports is obtained easily.

Figure 6A:
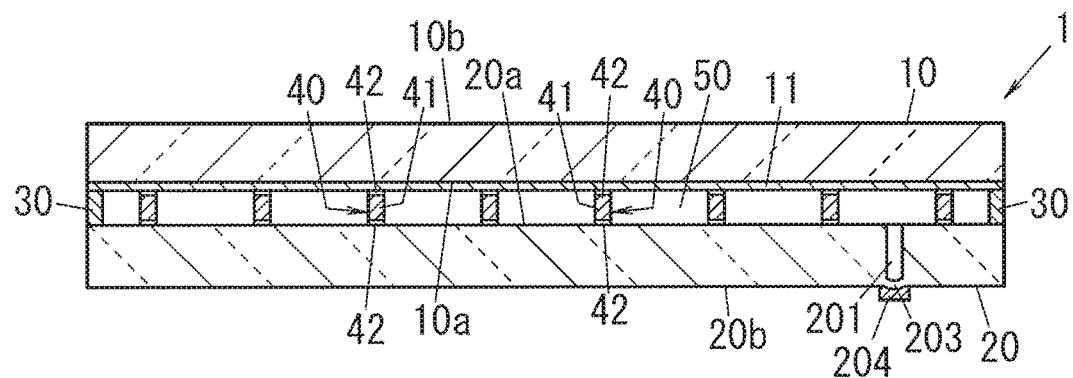
Figure 6B:
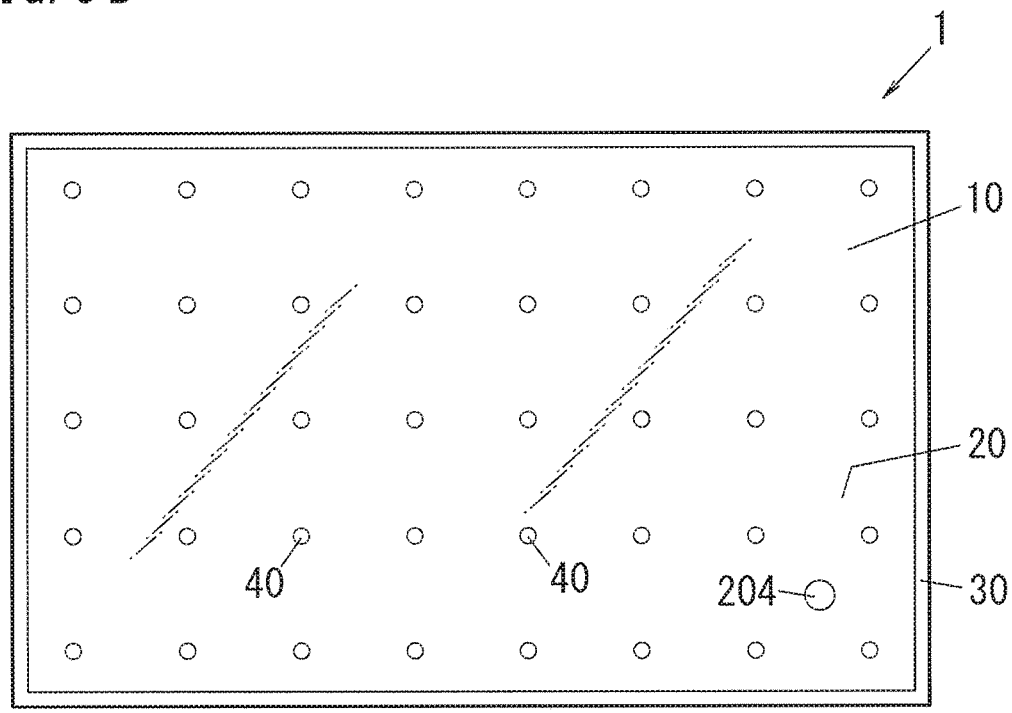

FIG. 6 illustrates another exemplary glass panel unit (as a second embodiment). In the following description, any constituent member of this second embodiment having the same function as the counterpart of the embodiment described above will be designated by the same reference signs as that counterpart's, and a detailed description thereof will be omitted herein. The glass panel unit of the second embodiment has an exhaust port 201, which is a major difference from the embodiment described above. In this case, the exhaust port 201 means a hole through which evacuation has been performed to create a vacuum space 50.

The outlet end of the exhaust port 201 is closed with a sealing portion 203, thus allowing the vacuum space 50 to maintain an internal pressure (e.g., a vacuum). The sealing portion 203 is formed of the exhaust pipe 202 (see FIG. 4C). The sealing portion 203 may be formed by heat-melting the glass as a constituent material for the exhaust pipe 202. The sealing portion 203 is covered with a cap 204, which is arranged outside the sealing portion 203. Covering the sealing portion 203 with the cap 204 increases the degree of closedness (i.e., airtightness) of the exhaust port 201. The cap 204 also reduces the damage to be done to the sealing portion 203, especially around the exhaust port 201.

The glass panel unit of the second embodiment may be manufactured basically by the manufacturing method of the integrated panel 3 described above (see FIGS. 4 and 5). More specifically, the glass panel unit may be obtained by forming the integrated panel 3 and by sealing the exhaust port 201. In that case, there is no need to cut off a portion with the exhaust port 201 from the integrated panel 3. In addition, the second glass adhesive 302 does not have to be used, either, Such a glass panel unit 1 may be easier to make, because there is no need to remove such a portion with the exhaust port 201.

Next, a glass panel unit 1 according to a third embodiment and a manufacturing method thereof will be described with reference to FIG. 7. Note that the glass panel unit 1 according to this third embodiment is obtained by simply providing some additional members to either the first embodiment or the second embodiment. Thus, any constituent member corresponding to a counterpart of the first embodiment will be designated by a combination of the same reference sign as that counterpart's and the suffix "B", and a detailed description thereof will be omitted herein.

A glass panel unit 1B according to a third embodiment includes a third panel T60B, which is arranged to face the second panel T20B. Although the third panel T60B is supposed to face the second panel T20B for convenience sake according to this embodiment, the third panel T60B may face the first panel T10B instead.

The third panel T60B includes at least a third glass plate 60B. The third glass plate 60B of the third panel T60B has a flat surface and a predetermined thickness. In this embodiment, the third panel T60B consists of the third glass plate 60B alone, Optionally, in the third panel T60B, a thermal reflective film may be provided on either surface of the third glass plate 60B. In that case, the third panel T60B is made up of the third glass plate 60B and the thermal reflective film.

The glass panel unit 1B further includes a second sealing member 70B, which is arranged between the second panel T20B and the third panel T60B to hermetically join the respective peripheral portions of the second panel T20B and the third panel T60B together. The second sealing member 70B is arranged in a ring between the peripheral portion of the second panel T20B and the peripheral portion of the third panel T60B. The second sealing member 70B is formed of a glass adhesive. Note that the second sealing member 70B may or may not be formed of the same glass adhesive as the sealing member 30B. That is to say, the material of the second sealing member 70B is not particularly limited.

The glass panel unit 1B of this embodiment has a second inner space 80B, which is sealed hermetically by the second panel T20B, the third panel T60B, and the second sealing member 70B and in which a dry gas is enclosed. Examples of the dry gas include dry rare gases such as an argon gas and dry air. However, any type of dry gas may be used without particular limitation.

In addition, inside the second sealing member 70B, arranged in a ring is a hollow framing member 61B. A through hole 62B leading to the second inner space 80B is cut through the framing member 61B. Inside the through hole 62B, housed is a desiccant 63B such as a silica gel.

The second panel T20B and the third panel T60B may be joined together as described below in almost the same way as in the step in which the first panel T10B and the second panel T20B are joined together.

First of all, a third substrate 600B to be the third panel T60B through this manufacturing method and an assembly including the first panel T10B and the second panel T20B (corresponding to the glass panel unit 1 of the first or second embodiment) are provided. The third substrate T600B includes at least a third glass substrate 600B. The third glass substrate 600B of the third substrate T600B has a flat surface and a predetermined thickness. In this embodiment, the third substrate T600B consists of the third glass substrate 600B alone. Optionally, the third substrate T600B may include a thermal reflective film on either surface thereof. In that case, the third panel T60B is made up of the third glass substrate 600B and the thermal reflective film.

A glass adhesive to be the second sealing member 70B in the end through this manufacturing method is disposed in the shape of a frame in either the peripheral portion of the third panel T60B or that of the second panel T20B (hereinafter referred to as a "third glass adhesive disposing step"). In this step, air passages similar to the air passages provided for the second glass adhesive 302 in the first or second embodiment are formed through the third glass adhesive.

Next, the third substrate T600B is arranged to face the second substrate T200B (hereinafter referred to as a "third substrate arrangement step").

Subsequently, the temperature is raised to, and maintained at, the melting temperature of the third glass adhesive (hereinafter referred to as a "third glass adhesive heating step"). In this embodiment, the third glass adhesive disposing step, the third substrate arrangement step, and the third glass adhesive heating step constitute a second inner space creating step.

Thereafter, a dry gas is introduced into the second inner space 80B (hereinafter referred to as a "dry gas introduction step"). In this step, the second inner space 80B may be filled with the dry gas only or some air may be left there.

Then, the air passages are closed so that the second inner space 80B is sealed hermetically (hereinafter referred to as a "second space sealing step").

In this manner, the glass panel unit 1B is obtained. The glass panel unit 1B of this embodiment achieves further improved thermal insulation properties.

Figure 8:
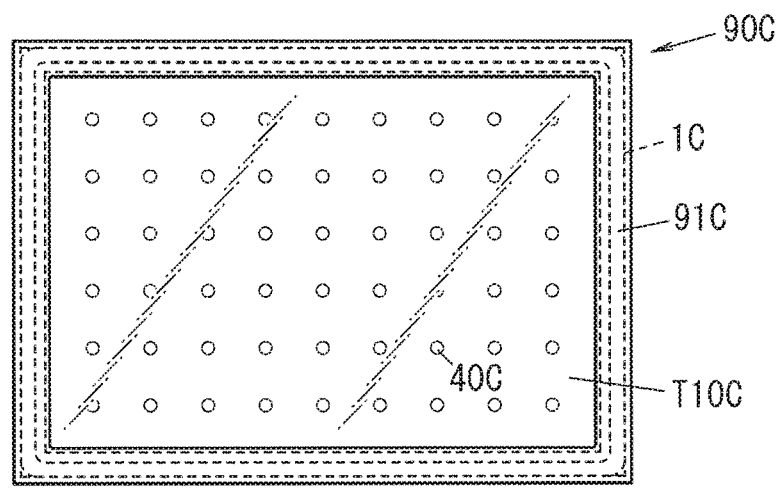
FIG. 8 is a plan view illustrating a glass window according to a fourth embodiment.

Next, a fourth embodiment will be described with reference to FIG. 8. The fourth embodiment is a glass window 90C including the glass panel unit 1 (or 1B) according to any of the first to third embodiments described above. In the following description, any constituent member of the fourth embodiment having the same function as the counterpart of the first embodiment described above will be designated by a combination of the same reference sign as that counterpart's and the suffix "C", and a detailed description thereof will be omitted herein.

The fourth embodiment includes a glass panel unit 1C similar to the glass panel unit of any of the first to third embodiments. The glass window 90C is formed by attaching a window frame 91C to an outer peripheral portion of the glass panel unit 1C. Specifically, the window frame 91C is formed to have a U-cross section and the peripheral portion of the glass panel unit 1C is fitted into the window frame 91C, which is provided over the entire outer periphery of the glass panel unit 1C.

The glass window 90C of this fourth embodiment includes the glass panel unit 1 with thermal insulation properties, and therefore, exhibits excellent thermal insulation properties itself as well.

As is clear from the foregoing description of embodiments, a glass panel unit 1 according to a first aspect of the present invention includes: a first panel T10 including at least a first glass plate 10; a second panel T20 facing the first panel T10 and including at least a second glass plate 20; a sealing member (frame member 30); and a spacer 40. The sealing member is formed in a frame shape and bonded hermetically to respective facing peripheral portions of the first panel T10 and the second panel T20. The spacer 40 is provided between the first panel T10 and the second panel T20. A reduced pressure space (e.g., a vacuum space 50 in the embodiment described above) is provided as an inner space between the first panel T10 and the second panel T20. The spacer 40 includes a resin body 41 and at least one ultraviolet protective layer 42 provided on a surface of the resin body 41.

According to the first aspect, the spacer 40 including the resin body 41 and the ultraviolet protective layer 42 allows for reduction in degradation of the resin body 41 of the spacer 40 due to exposure to an ultraviolet ray, thus creating a vacuum space 50 with good stability. This reduces a negative impact on the appearance of the panel unit 1. In addition, the spacer 40 including the resin has sufficient elasticity to enhance the impact resistance thereof. On top of that, the spacer 40 including the resin has a thermal conductivity low enough to improve the thermal insulation properties of the glass panel unit 1.

In a glass panel unit 1 according to a second aspect of the present invention, which would be realized in combination with the first aspect, the ultraviolet protective layer 42 is a metallic thin film.

According to the second aspect, the ultraviolet protective layer 42 is able to serve as an ultraviolet reflective film, because a metallic thin film has excellent ultraviolet reflectivity. Thus, according to the second aspect, the spacer 40 is allowed to exhibit an enhanced ultraviolet protection effect.

In a glass panel unit 1 according to a third aspect of the present invention, which would be realized in combination with the first aspect, the ultraviolet protective layer 42 is a resin layer with ultraviolet protection ability.

According to the third aspect, the ultraviolet protective layer 42 is able to function as a degradation sacrificial layer. This allows the spacer 40 to have enhanced ultraviolet protection ability according to the third aspect.

In a glass panel unit 1 according to a fourth aspect of the present invention, which would be realized in combination with any one of the first to third aspects, the ultraviolet protective layer 42 includes a first ultraviolet protective layer 42a adjacent to the first panel T10 and a second ultraviolet protective layer 4b adjacent to the second panel T20.

According to the fourth aspect, no matter which of the first panel T10 or the second panel T20 faces outdoors when the glass panel unit 1 is installed, degradation of the spacer 40 due to exposure to an ultraviolet ray is reducible significantly.

In a glass panel unit according to a fifth aspect of the present invention, which would be realized in combination with any one of the first to fourth aspects, the resin body includes a polyimide.

According to the fifth aspect, the high heat resistance of the polyimide allows the spacer 40 to maintain its original shape even under intense heat during the manufacturing process of the glass panel unit 1.

In a glass panel unit 1 according to a sixth aspect of the present invention, which would be realized in combination with any one of the first to fifth aspects, the resin body 41 is formed of at least one resin sheet.

According to the sixth aspect, the spacers 40 are formed more easily.

A glass panel unit 1B according to a seventh aspect of the present invention, which would be realized in combination with any one of the first to fifth aspects, further includes a third panel T60B, a second sealing member 70B, and a thy gas. The third panel T60B is arranged to face the second panel T20B and includes at least a third glass plate 60B, The second sealing member 70B is bonded hermetically to respective facing peripheral portions of the second panel T20B and the third panel T60B. The dry gas is enclosed in a second inner space 80B that is sealed hermetically by the second panel T20B, the third panel T60B, and the second sealing member 70B.

According to the seventh aspect, a glass panel unit 1B with high thermal insulation properties is obtained.

A glass window 90C according to an eighth aspect of the present invention includes: the glass panel unit 1, 1B according to any one of the first to seventh aspects; and a window frame 91C attached to a peripheral portion of the glass panel unit 1, 1B.

According to the eighth aspect, a glass window 90C may be formed to include the glass panel unit 1, 1B with thermal insulation properties, thus providing a glass window 90C with high thermal insulation properties.

A method for manufacturing a glass panel unit 1, according to a ninth aspect of the present invention includes a composite sheet forming step, a spacer forming step, a spacer arrangement step, a glass adhesive disposing step, an evacuation step, and a bonding step. The composite sheet forming step includes forming an ultraviolet protective layer 42 on at least one surface of a resin sheet. The spacer forming step includes forming a spacer 40 by punching a composite sheet 400 including the resin sheet and the ultraviolet protective layer 42. The spacer arrangement step includes arranging the spacer 40 between a first substrate T100 including at least a first glass substrate and a second substrate T200 including at least a second glass substrate 200. The glass adhesive disposing step includes disposing a glass adhesive in a frame shape between the first substrate T100 and the second substrate T200. The evacuation step includes evacuating a space located between the first substrate T100 and the second substrate T200 and surrounded with the glass adhesive 300. The bonding step includes bonding the first substrate T100 and the second substrate T200 together with the glass adhesive 300.

According to the ninth aspect, a glass panel unit in which a reduced pressure space is created between the first panel T10 and the second panel T20 is provided.

A method for manufacturing a glass panel unit 1 according to a tenth aspect of the present invention includes a composite sheet forming step, a spacer forming step, a spacer arranging and adhesive disposing step, a substrate arrangement step, an evacuation step, and a bonding step. The composite sheet forming step includes forming an ultraviolet protective layer 42 on at least one surface of a resin sheet. The spacer forming step includes forming a plurality of spacers 40 by punching a composite sheet 400 including the resin sheet and the ultraviolet protective layer 42. The spacer arranging and adhesive disposing step includes disposing a glass adhesive 300 in a frame shape on a peripheral portion of a surface of a first substrate T100 including at least a first glass substrate 100 and arranging the plurality of spacers 40 in a space surrounded with the glass adhesive 300. The substrate arrangement step includes arranging a second substrate T200 including at least a second glass substrate to allow the second substrate T200 to face the surface of the first substrate T100 on which the glass adhesive 300 is disposed. The evacuation step includes evacuating a space located between the first substrate T100 and the second substrate T200 and surrounded with the glass adhesive 300. The bonding step includes bonding the first substrate T100 and the second substrate T200 together with the glass adhesive 300 in the shape of the frame.

According to the tenth aspect, a glass panel unit in which a reduced pressure space is created between the first panel T10 and the second panel T20 is provided.

REFERENCE SIGNS LIST

1 Glass Panel Unit
10 First Glass Plate
T10 First Panel
20 Second Glass Plate
T20 Second Panel
30 Frame member (Sealing Member)
40 Spacer
41 Body (Resin Body)
42 Ultraviolet Protective Layer
42a First Ultraviolet Protective Layer
42b Second Ultraviolet Protective Layer
50 Vacuum Space (Reduced Pressure Space)
60B Third Glass Plate
T60B Third Panel
70B Second Sealing Member
80B Second Inner Space
90C Glass Window
100 First Glass Substrate
T100 First Substrate
200 Second Glass Substrate
T200 Second Substrate
300 Glass Adhesive
400 Composite Sheet
410 Resin Sheet

The invention claimed is:

1. A method for manufacturing a glass panel unit which includes:
   a first panel including at least a first glass plate;
   a second panel facing the first panel and including at least a second glass plate;
   a sealing member formed in a frame shape and bonded hermetically to respective facing peripheral portions of the first panel and the second panel; and at least one spacer provided in an inner space between the first panel and the second panel, wherein the inner space being a reduced pressure space, the at least one spacer including a resin body and at least one ultraviolet protective layer provided on a surface of the resin body, and the spacer being formed by punching a composite sheet including a resin sheet and the ultraviolet protective layer formed either on one surface or on both surfaces of the resin sheet, the method comprising:

a composite sheet forming step of forming the ultraviolet protective layer on at least one surface of the resin sheet;

a spacer forming step of forming a plurality of spacers by punching the composite sheet including the resin sheet and the ultraviolet protective layer;

a spacer arrangement step of arranging the plurality of spacers between a first substrate including at least a first glass substrate and a second substrate including at least a second glass substrate;

a glass adhesive disposing step of disposing a glass adhesive in a frame shape between the first substrate and the second substrate;

an evacuation step of evacuating a space located between the first substrate and the second substrate and surrounded with the glass adhesive; and a bonding step of bonding the first substrate and the second substrate together with the glass adhesive in the shape of the frame.

2. A method for manufacturing a glass panel unit which includes:

a first panel including at least a first glass plate;

a second panel facing the first panel and including at least a second glass plate;

a sealing member formed in a frame shape and bonded hermetically to respective facing peripheral portions of the first panel and the second panel; and at least one spacer provided in an inner space between the first panel and the second panel, wherein the inner space being a reduced pressure space, the at least one spacer including a resin body and at least one ultraviolet protective layer provided on a surface of the resin body, and the spacer being formed by punching a composite sheet including a resin sheet and the ultraviolet protective layer formed either on one surface or on both surfaces of the resin sheet, the method comprising:

a composite sheet forming step of forming the ultraviolet protective layer on at least one surface of the resin sheet;

a spacer forming step of forming a plurality of spacers by punching the composite sheet including the resin sheet and the ultraviolet protective layer;

a step including disposing a glass adhesive in a frame shape on a peripheral portion of a surface of a first substrate including at least a first glass substrate, and arranging the plurality of spacers in a space surrounded with the glass adhesive;

a substrate arrangement step of arranging a second substrate including at least a second glass substrate to allow the second substrate to face the surface of the first substrate on which the glass adhesive is disposed;

an evacuation step of evacuating a space located between the first substrate and the second substrate and surrounded with the glass adhesive; and a bonding step of bonding the first substrate and the second substrate together with the glass adhesive in the shape of the frame.

* * * * *